No. 719,109.  
PATENTED JAN. 27, 1903.  
B. M. W. HANSON.  
FLUID PRESSURE OPERATED DEVICE.  
APPLICATION FILED MAY 20, 1901.  
NO MODEL.  
4 SHEETS—SHEET 1.

Witnesses:  
H. Mallner  
Joseph Merritt

Inventor  
B. M. W. Hanson  
By W. H. Honiss, Atty.

No. 719,109. PATENTED JAN. 27, 1903.
B. M. W. HANSON.
FLUID PRESSURE OPERATED DEVICE.
APPLICATION FILED MAY 20, 1901.
NO MODEL. 4 SHEETS—SHEET 3.

Witnesses:
H. Mallmur
Joseph Merritt

Inventor
B. M. W. Hanson
By Wm H Honiss, Atty.

No. 719,109. PATENTED JAN. 27, 1903.
B. M. W. HANSON.
FLUID PRESSURE OPERATED DEVICE.
APPLICATION FILED MAY 20, 1901.
NO MODEL. 4 SHEETS—SHEET 4.
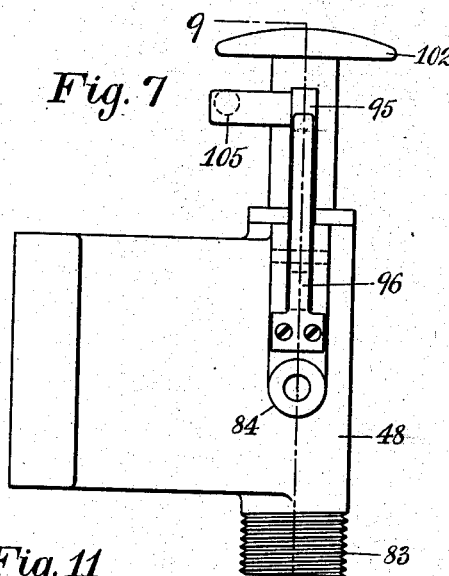
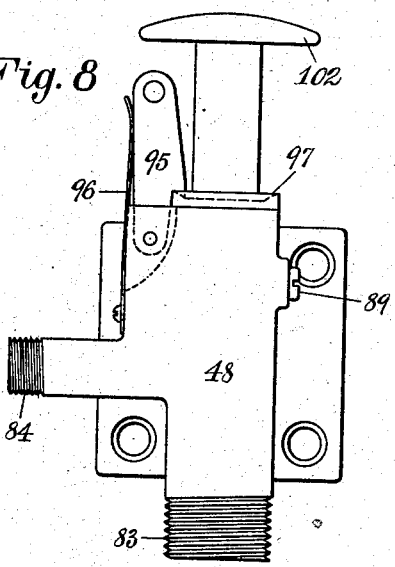
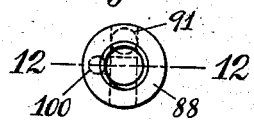
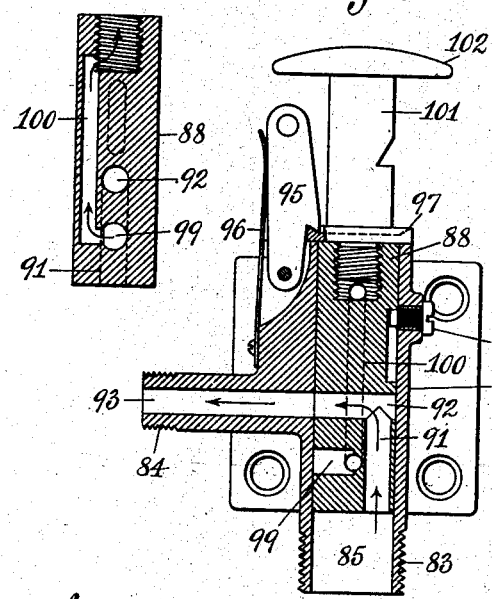
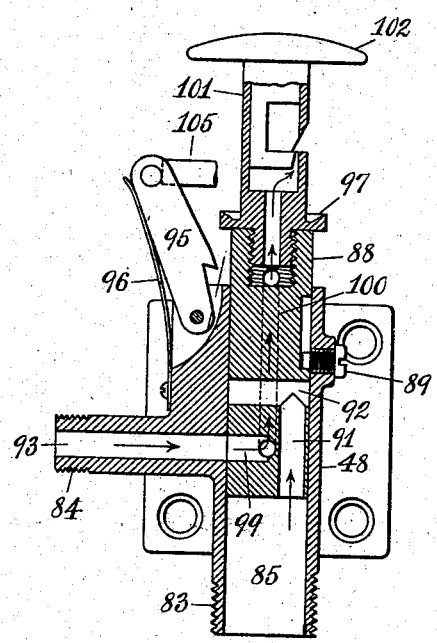
Witnesses:
H. Mallner
Joseph Merritt
Inventor
B. M. W. Hanson
By Wm H Honiss Atty.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FLUID-PRESSURE-OPERATED DEVICE.

SPECIFICATION forming part of Letters Patent No. 719,109, dated January 27, 1903.

Application filed May 20, 1901. Serial No. 61,118. (No model.)

*To all whom it may concern:*

Be it known that I, BENGT M. W. HANSON, a citizen of Sweden, and a resident of Hartford, in the county of Hartford and State of Connecticut, have invented certain new and useful Improvements in Fluid-Pressure-Operated Devices, of which the following is a specification.

This invention comprises improved means whereby compressed air or other pressure fluid may be utilized for inaugurating, controlling, reversing, and stopping the operations of many different kinds of machines.

This invention is herein illustrated as applied to a type of machines approximating that of the well-known engine-lathe, and it is shown as being adapted to impart different rotative speeds to the lathe-spindle, to reverse and oscillate the spindle, to reverse and otherwise control the reciprocating movements of the carriage or tool-slide of the lathe, to stop the operations of the machine at the completion of the work or at a predetermined stage therein, and to sound an alarm to notify the attendant or operator of the stopping of the machine.

A machine upon which the devices of this invention are employed to excellent advantage is shown in my United States Patent No. 688,515, of December 10, 1901, wherein the differential driving of the spindle 25 is shown to be accomplished by the use of mechanically-operated clutches instead of being operated by fluid-pressure devices like those of the present invention. The devices of the present invention may with only slight modification be substituted in the machine of that patent for the gearing, pulleys, and clutch mechanism which serve to drive the main spindle 25.

The construction, arrangement, and operation of this embodiment of the invention are illustrated in the accompanying drawings, in which—

Figure 1:
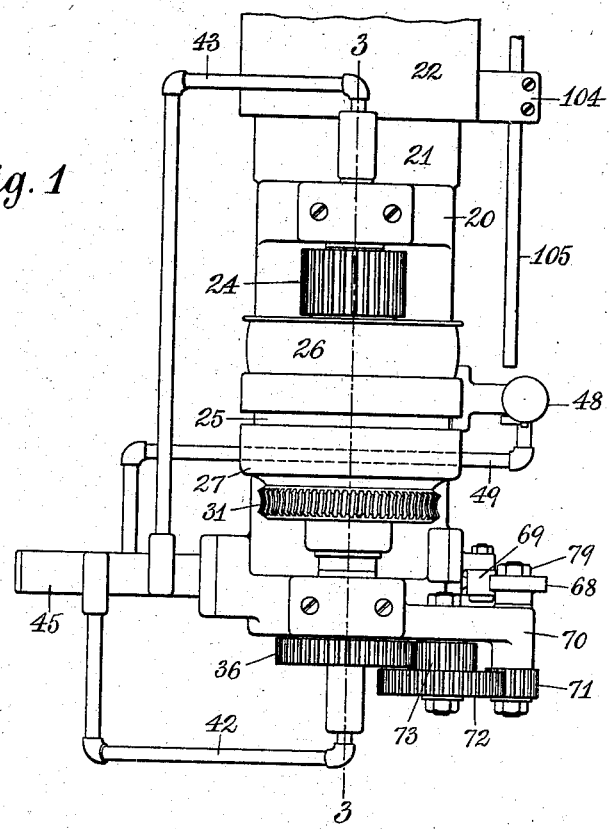
Figure 2:
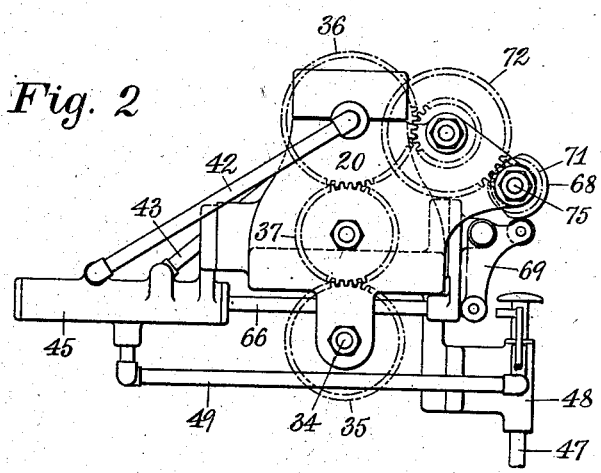
Figure 3:
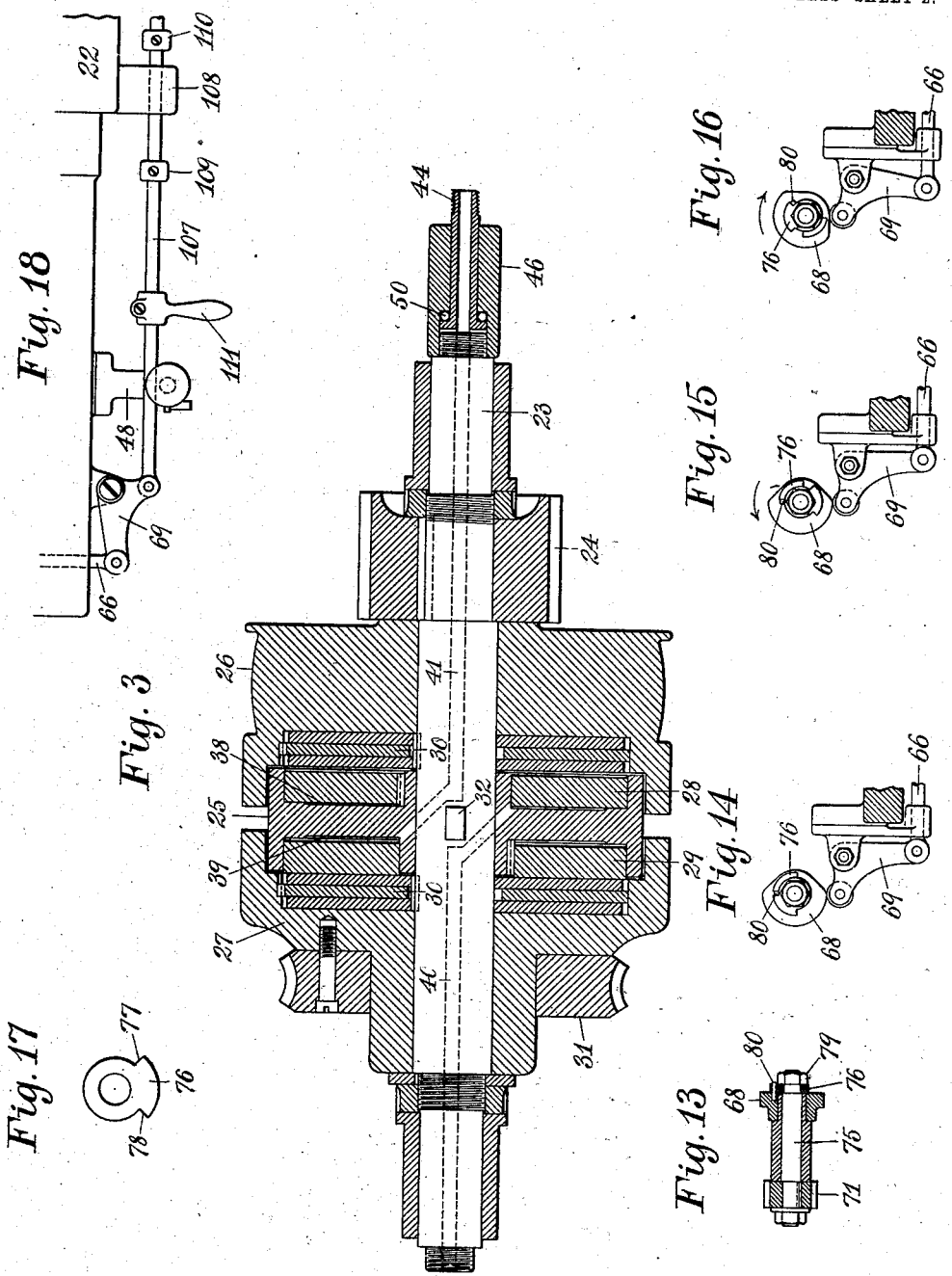
Figure 4:
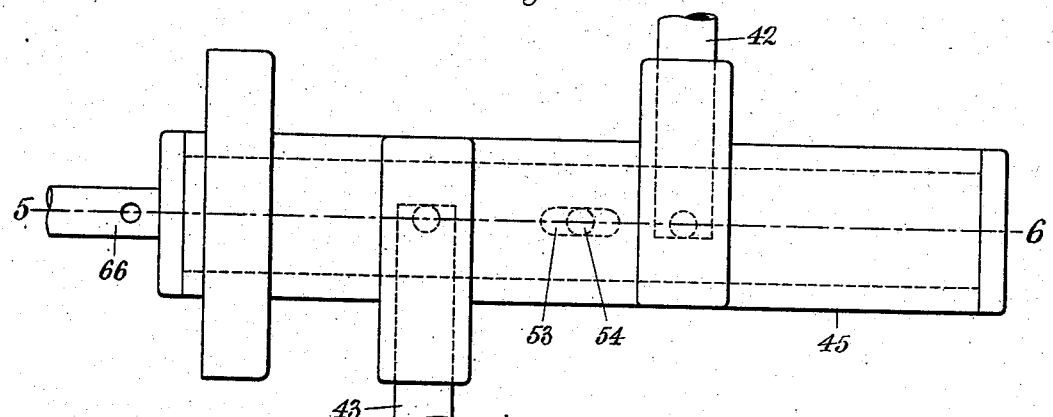
Figure 5:
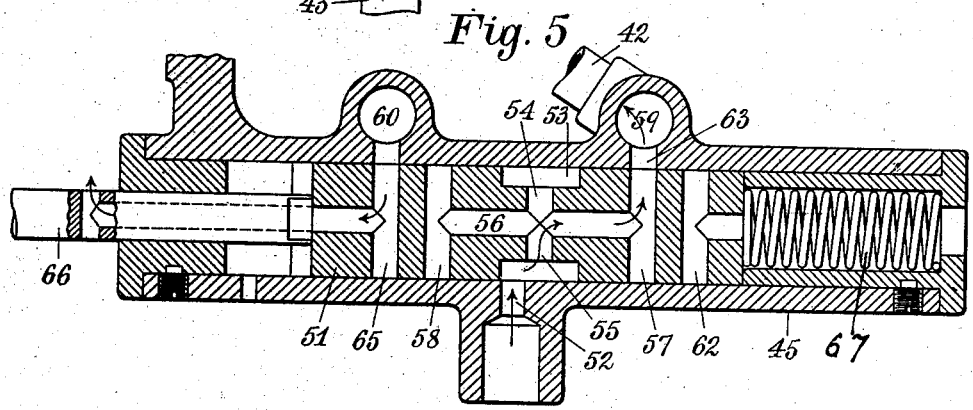
Figure 6:
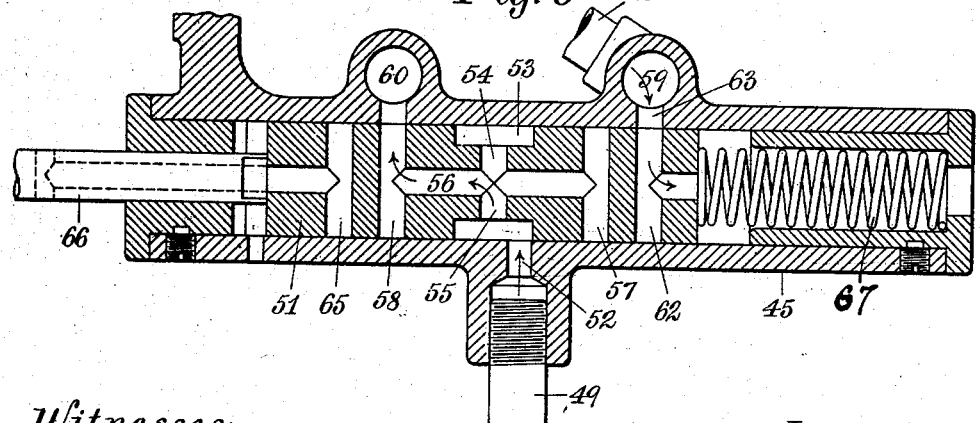

Figure 1 is a plan view, and Fig. 2 is an end view, showing this embodiment of my invention and showing also the outlines of the relevant portions of a lathe to a sufficient extent to enable the relation and coöperation of my devices therewith to be understood. Fig. 3 is a side view, in enlarged scale, in section, taken on the line 3 3 of Fig. 1 through the longitudinal center of the spindle and driving devices of Figs. 1 and 2, showing the clutch-operating parts. Fig. 4 is a plan view, in enlarged scale, showing the casing for the controlling-valve which controls the induction and exhaustion of the air or other pressure fluid to the clutch-pistons of Fig. 3. Figs. 5 and 6 are side views in section, taken along the longitudinal center 5 6 of Fig. 4, showing the valve in the two extreme positions of its movement, Fig. 6 illustrating the position of the valve for admitting the pressure fluid to the right-hand end of the spindle of Fig. 3, so as to move the clutch into engagement with the slower-driving worm-gear, as shown in that figure, while Fig. 5 shows the valve in a position to admit the pressure fluid to the opposite end of the spindle, thereby engaging it with the quicker-driving pulley. Fig. 7 is an end view, and Fig. 8 a front view, with reference to the machines of Figs. 1 and 2, of the stop or throttle valve for admitting or excluding the pressure fluid to or from the controlling-valve of Figs. 4, 5, and 6. Fig. 9 is a front view showing the valve and its casing in section, taken along the line 9 10 of Fig. 7, showing the valve latched in its open position for admitting the pressure fluid to the controlling-valve. Fig. 10 is a view similar to that of Fig. 9, excepting that the valve is therein moved to its closed position, as permitted by the withdrawal of the latch. In this view also the upper or alarm portion of the device is shown in longitudinal section to illustrate the manner in which the exhaust-pressure fluid makes its exit through and sounds the alarm-whistle. Fig. 11 is a plan view, and Fig. 12 is a side view, of the valve of Figs. 9 and 10, Fig. 12 being shown in section taken along the line 12 12 of Fig. 11. Figs. 13 to 17 illustrate a slightly-modified arrangement for driving the cam which operates the distributing-valve of Figs. 4, 5, and 6, whereby either a variable oscillatory movement or a continued rotary movement may be imparted to the spindle. Fig. 13 is a sectional side view showing the manner of mounting and operating the valve-cam. Fig. 14 represents this device as adjusted to impart a continued rotary movement to the spindle, like that of the non-adjustable form of this device shown in Figs. 1 and 2. Figs. 15 and 16 represent the device adjusted to impart an oscillatory movement to the spindle, representing the cam in the two positions between which it repeatedly oscillates as the result of such an adjustment. Fig. 17 is an end view of one of the adjustable washers of the four preceding figures. Fig. 18 is a plan view showing a modification of the adjustment of the machine of Fig. 1, in which the controlling-valve is operated by a reciprocating portion of the machine, such as the tool-carriage of the lathe herein illustrated.

The head 20 of the lathe herein shown is understood to be mounted upon a bed 21, upon which is also mounted a slide or carriage 22 for supporting and moving the work or the tools therefor, as the case may be. The driving-shaft 23 and the clutch devices therefor are shown in enlarged scale in the sectional view of Fig. 3. This may be the main spindle of the machine, or it may be provided, as herein shown, with a gear 24, by means of which motion is imparted therefrom to any other desired shaft or spindle of the machine. Upon the shaft 23 is fixed the driven member 25 of the clutch by means of the key 32. This member forms, substantially, a double-ended cylinder, being recessed on both sides to receive the annular pistons 28 and 29. The driving members 26 and 27 of the clutch are both mounted to turn loosely with relation to the shaft 23. As herein shown, the member 26 is a pulley, and the member 27 is provided with an attached or integral worm-gear 31. A suitable rotative movement is imparted to the pulley and to the gear by any appropriate and well-known transmission apparatus and at any desired rate of rotation, which may be in the same direction or in opposite directions, as the conditions may require. The annular pistons 28 and 29 are splined upon the opposite sides of the cylinder 25, and a series of friction plates or disks 30 are interposed between these pistons and their respective driving members 26 and 27, the alternate plates being splined to the said driving members and to the shaft 23, so that the outward thrust of the piston 28 will cause the cylinder 25, and hence its shaft 23, to turn with the clutch-pulley 26, and the corresponding action of the piston 29 will similarly cause that cylinder and shaft to be driven by the clutch 27.

When it is desired to operate the carriage 22 in a particular relation to the shaft 23 or in a particular relation to the mechanism that may be driven by the said shaft through the pinion 24, the connection with the carriage may be made by means of a feed or lead screw 34, as in the case of an ordinary engine-lathe, the proper rotative relation being secured and maintained by means of gears 35 and 36 and suitable intermediate gears 37.

The annular pistons 28 and 29 are single-acting. Slight clearance-spaces 38 and 39 are preferably provided behind the pistons, and the air or other pressure fluid employed is conducted to the rearward sides of the pistons through the passages 40 and 41, respectively. These passages are preferably made along the axial center of the shaft 23, extending to its opposite ends, which are provided with suitable stuffing-boxes for receiving the non-rotating ends of the tubes 42 and 43, respectively, through which the pressure fluid is conducted to the pistons from the valve-chest 45. That pressure fluid is admitted to the valve-chest from the supply-pipe 47, past a stop-valve apparatus 48, and through the connecting-pipe 49.

The connection of the non-rotating pipes 42 and 43 is preferably made by means of the joint shown in Fig. 3. The gland 44, to which the pipe 43 is attached, is fitted in the collet 46 and is provided at its rearward end with an enlarged head, which fits in a correspondingly-counterbored portion of the collet, which is attached to the shaft 23, as by means of a screw-thread. The outward longitudinal thrust of the gland against the collet due to the internal pressure is preferably taken by a circle of balls 50, interposed between the respective shoulders of the gland and collet.

The admission of the pressure fluid to the respective pistons 28 and 29 is regulated by a controlling-valve 51, located in the valve-chest 45, as best shown in Figs. 4, 5, and 6. This valve is preferably of cylindrical form, having a relatively large peripheral area as compared with the area of the ports and passages required for the pressure fluid, so as to afford ample wearing-surface. Those passages are made in the interior of the cylindrical valve and their ports open upon the exterior surface thereof only to the extent required for the induction and exhaust of the pressure fluid and for the balancing of that pressure.

The pressure fluid from the connecting-pipe 49 enters the valve through the inlet 52 and fills the longitudinal passage 56 and the lateral passages 57 and 58. These passages are preferably cylindrical, so as to be easily made by the use of a drill. The ends of the passages 54 and 55 are extended longitudinally to the extent required by the movements of the valve, thereby forming the longitudinal spaces 53, which maintain communication between the inlet 52 and the passages of the valve at all positions of the latter. These spaces 53, the lateral passages 57 and 58, and the exhaust-passages 62 and 65 open with equal areas upon the exterior surface of the valve, so that the pressure in those passages is exerted equally in opposite directions against the interior wall of the valve-chest, and the liability and extent of leakage of the pressure fluid is limited to the small circles represented by the edges of the port-openings as compared with a circle representing the circumference of the valve, as in the case of the ordinary spool-shaped valve. This controlling-valve forms the subject-matter of a divisional application, Serial No. 79,665, filed October 23, 1901. When the valve occupies the position shown in Fig. 5, the pressure fluid passes through the ports in the directions shown by the arrows in that figure to the outlet 59 and thence through the pipe 42 to the piston 28. When the valve is moved to the position shown in Fig. 6, the pressure fluid passes, as shown by the arrows in that view, through the outlet 60 and thence through the pipe 43 to the piston 29. This movement of the valve also brings its exhaust-port 62 into coincidence with the port 63, thereby enabling the column of pressure fluid extending to the piston 28 to be exhausted through the right-hand end of the valve-chest, as shown in Fig. 6, which may be open to the atmosphere, as here shown, when employing air as the pressure medium. When the valve is moved again to the position shown in Fig. 5 to actuate the piston 28, the column of pressure fluid leading to the piston 29 through the pipe 43 is exhausted through the exhaust-port 65 and through the hollow valve-stem 66, as shown by the arrows in Fig. 5.

As a means for operating the valve it is provided with the stem 66, integral with or attached in any convenient way to the end of the valve and extending to the valve-controlling means, which in the organization here shown is the cam 68, the connection in the arrangement shown in Figs. 1 and 2 being made by means of a bell-cranked arm 69, pivotally mounted upon the bed of the machine. One end of this arm is connected with the valve-stem 66, while the other end is engaged by the cam 68, preferably by means of a cam-roller. The cam 68 is mounted to rotate in any convenient way, as in the bearing 70 here shown, a suitable rate of rotation being imparted by means of gearing driven from the gear 36 on the shaft 23 or driven from any shaft of the machine with which it is desired to maintain the operative relation of the valve. The cam 68 is shaped so as to impart the required length of stroke to the valve 51, moving it alternately to its two positions represented in Figs. 5 and 6. The cam shown herein is adapted to control the valve so that the latter is moved once in each direction at each rotation of the cam, and if it is desired to operate each of the pistons 28 and 29 once for each rotation of the shaft 23 then in that case the cam should obviously be geared to make one rotation for each rotation of the shaft 23. Any desired rotative relation may be obtained by suitable proportioning of the cam-gear 71 and the intermediate gears 72 and 73.

It is evident that the driving devices for the shaft 23 may be utilized to rotate that shaft continuously in one direction at different rotative speeds, or that the shaft may be rotated in one direction by the pulley 26 and in the opposite direction by the worm-gear 31, according to the arrangement of the driving-belts or other transmission devices. In order to enable the movements of the valve 51 to be properly controlled under such diverse movements of the shaft 23, the valve-cam is preferably mounted and operated as illustrated in Figs. 13 to 17, inclusive. The cam 68 is mounted to rotate upon a hub or sleeve or bushing of the arm or bearing 70, so that the cam-shaft 75 may rotate freely within the bearing without frictional contact with the cam. That shaft is provided with two driving dogs or collars 76, (best shown in Fig. 17,) which are cut away to form the shoulders 77 and 78. These collars are clamped against a shoulder of the shaft 75, just outside of the face of the cam 68, by means of a nut 79 or in any well-known way, so as to permit one or both of them to be turned upon the shaft to bring their respective driving-shoulders 77 and 78 into any desired relation to each other and to clamp them in that position. The shoulders 77 and 78 are adapted to engage with a carrying pin or stud 80, projecting from the face of the cam 68. When it is desired to rotate the shaft 23 continuously in one direction and at different rotative speeds, the pulley 26 and the gear 31 are belted or geared to run in the desired direction and at the desired relative speeds. The driving-collars 76 are then preferably set, as shown in Fig. 14, with their driving-shoulders close to the opposite sides of the pin 80, so as to carry it forward steadily with the shaft 75. When the high part of the cam is in contact with its roller, as shown in Fig. 14, the arm 69 is depressed and the controlling-valve 51 is by means of the connecting-stem 66 moved to the position shown in Fig. 5, thereby admitting the pressure fluid to the piston 28 and clutching the shaft 23 to the pulley 26. The cam-shaft 75 is geared to rotate in the desired ratio to the spindle 23, and as the cam turns forward far enough to bring its lowest portion into contact with the cam-roller the controlling-valve 51 is allowed to be pushed by its spring 67 to the position shown in Fig. 6, thereby admitting pressure fluid to the left-hand piston 29 of Fig. 3 and clutching the spindle 23 to the driving-gear 31. When it is desired to reverse the direction of rotation of the shaft or spindle 23 by the operations of its clutch, the pulley 26 and the gear 31 are correspondingly driven in reverse directions, and the collars 76 are adjusted to leave an angular interval between them, according to the desired amount of oscillation of the spindle 23. The cam will then receive an oscillatory movement alternately from one to the other of the two positions shown in Figs. 15 and 16, each of which represents the end of the movement of the cam in the direction of its adjacent arrow, it being understood in each case that the movement in the direction indicated by the arrow is arrested by the reversal of the spindle 23 through the action upon the valve of the respective movements which have in each case just been imparted by the cam.

In some classes of machinery to which this invention is applicable it may be found suitable and sufficient thus to control the admission of the pressure fluid by means of a valve, as 68, directly from a supply-pipe, as 47, using an ordinary valve or cock for shutting off the supply when it is desired to stop the machine; but for many purposes it is found desirable to employ a stop-valve which may be operated either by hand or automatically by the devices of the machine when the latter has completed its work or reached a predetermined stage therein. I therefore prefer to interpose in the supply-pipe an automatically-operated stop-valve like that illustrated in Figs. 7 to 13, inclusive, that valve being also preferably adapted, as herein shown, to sound an alarm whenever the machine is stopped. The embodiment of this stop-valve shown herein is mounted in a casing 48, which may be integral with the machine or removably attached thereto. The casing is provided with a nipple 83 for attaching the supply-pipe 47 and with the nipple 84 for attaching the connecting-pipe 49, the inlet from the pipe 47 and the outlet to the pipe 49 preferably intersecting each other at right angles, as herein shown. The inlet 85 is preferably cylindrical and contains the stop-valve 88, which is shown in detail in Figs. 11 and 12. That valve is fitted to slide longitudinally to the extent represented by a comparison of Figs. 9 and 10, its limit of movement being determined by a stop-screw 89 or in any convenient way. The stop-screw, as herein shown, also serves to prevent the cylindrical valve from turning around. The valve is provided with the longitudinal passage 91, leading from the inlet 85 to the transverse port 92, which when the valve is in the position shown in Fig. 9 coincides with the outlet-port 93, leading to the controlling or distributing valve 51. The transverse port 92 opens with equal area upon the opposite sides of the inner wall of the cylinder, so that the transverse pressure is taken by those walls, and therefore does not react upon the valve, so as to interfere in the slightest degree with its sliding movement; but the longitudinal pressure against the lower end of the valve is not balanced by any counteracting downward pressure, so that the constant tendency of the pressure is to force that valve upwardly to the position shown in Fig. 4, and in order to retain the valve in its lower position (shown in Fig. 9) a latch 95 is provided. That latch is pivotally mounted on the casing 48 and is pressed by means of a spring 96 into engagement with a shoulder 97, appurtenant to the valve. Therefore when it is desired to stop the machine it is only necessary to push the latch 95 aside, as shown in Fig. 10, when the upward pressure from the inlet 85 will move the valve to its closed position. (Shown in the latter figure.) The stop-valve is also provided with a lateral inlet 99, which is connected by means of the duct 100 with a device capable of being sounded by the exhaust pressure fluid through the said duct. In the present instance this sounding device is represented as being a reed or whistle 101, which is screwed into the top of the valve and is provided with a knob or button 102, by means of which the operator may push down the valve to start the machine into operation. In the device as herein illustrated this whistle portion is also provided with the shoulder 97 for engaging with the latch 95. By this arrangement the pressure fluid contained in the pipes and passages between the stop-valve and the pistons 28 or 29 will when the stop-valve is moved to the position shown in Fig. 10 return through the inlet 99 and the duct 100 and escape into the atmosphere through the reed or whistle, sounding that whistle until the pressure fluid exhausts itself, thus serving as an alarm or notification to the attendant that the machine has stopped. This stop-valve and alarm forms the subject-matter of a divisional application, Serial No. 79,666, filed October 23, 1901.

The machine may be stopped at any time at the will of the operator by merely pushing the latch aside, and it may be automatically stopped by providing any suitable operative connection between the latch and the appropriate moving portion of the machine. As illustrated herein, the automatic stopping is shown to be accomplished by the movements of the carriage 22. That carriage is provided with a hub 104, which supports a thrust or stop rod 105, which may be moved to any desired position in the hub and clamped therein, being so adjusted as to collide with the latch 95, as shown in Fig. 10, and disconnect it from the shoulder 97 when the carriage reaches the desired position. This is a simple form of operative connection for withdrawing the latch, and this may be readily varied in form and arrangement to suit the circumstances of particular cases in ways that will suggest themselves to any mechanic.

In Fig. 18 is shown a modified arrangement of some of the features of this invention, whereby the valve may be operated alternately in opposite directions by the direct action of any reciprocating body, such as the carriage 22 of the machine illustrated herein. In this modification the bell-crank 69 of the valve-stem 66 is turned at right angles to the position shown in the previous figures, and a rod 107 is connected therewith in place of the cam-roller of the previous figures. The rod extends through an opening in the hub 108, which in the machine of Fig. 1 may be the hub 104, and is provided with adjustable collars 109 and 110, which may be adjusted to any desired position in relation to the hub 108, so that the latter shall move the valve and reverse the movement of the carriage when it thus collides with either of the collars at the end of its movement. The rod 107 may also be provided with a handle 111, by means of which the valve may be operated by hand at any intermediate position of the carriage.

The alarm device may, by a suitable passage connecting the duct 100 with the inlet 85 when the valve is in the position shown in Fig. 10, be operated directly by the pressure-fluid supply when the pressure fluid is cut off by the valve, as shown in that figure; but for most purposes the exhaust pressure fluid will be found sufficient and is preferable in such cases for the reason that the noise of the alarm then ceases after it has served its purpose. It will be obvious to those skilled in the mechanic's arts that many other modifications may be made in these devices to adapt them to particular purposes or to various environments.

Either the controlling-valve shown in Figs. 4, 5, and 6 or the stop-valve shown in Figs. 7 to 12, inclusive, may be employed without the other in connection with a fluid-pressure-operated clutch and the associated mechanism driven thereby for actuating those valves or either of them. For example, the inlet-pipe 49 may be connected directly to either of the inlet-pipes 42 or 43 without the intervention of the controlling-valve, or each of the pipes 42 and 43 may be provided with its own independent stop-valve and the latter be operated by the movements of the carriage 22 or any other movable part driven by the operation of the clutch; or the controlling-valves shown in Figs. 4, 5, and 6 may employed without the stop-valve, the pressure fluid being admitted through the pipe 49 directly from the compressor or other source of pressure, in which case the controlling-valve would be operated automatically, as herein described, by the cam 68, driven by the operations of the clutch.

I claim as my invention—

1. In combination with the driving devices and driven shaft of a machine, controlling devices therefor, operated by fluid-pressure, comprising a fluid-pressure-operated rotatable clutch for connecting and disconnecting the said shaft from its driving devices, a valve for controlling the distribution of the pressure fluid to the said clutch, and means operable with the said shaft, for automatically operating the said distributing-valve.

2. In combination with the driven shaft of a machine, a rotatable clutch comprising a driven member fixed to the said shaft, and provided with a plurality of oppositely-disposed pistons, frictional driving devices arranged adjacent to the pistons, and means operable with the said shaft for independently and automatically operating the said pistons by fluid-pressure.

3. In combination with the driven shaft of a machine, a rotatable clutch comprising a driven member fixed to the said shaft, and provided upon its sides with oppositely-disposed pistons, frictional driving devices arranged adjacent to the pistons, and a valve automatically operable with the said driven shaft for controlling the distribution of pressure fluid to the pistons.

4. In combination with the driven shaft of a machine, a rotatable clutch comprising a driven member fixed to the said shaft and provided upon its sides with oppositely-disposed pistons, frictional driving devices arranged adjacent to the pistons, a valve for controlling the distribution of pressure fluid to the pistons, and means operable with the said shaft for automatically moving the valve in suitable predetermined time and relation to the shaft.

5. The combination with a driven shaft of a rotatable clutch comprising a driven member fixed to the said shaft and provided upon its sides with oppositely-disposed pistons, frictional driving devices arranged adjacent to the pistons, a valve for controlling the distribution of pressure fluid to the pistons, and a cam driven by the said clutch, for automatically moving the valve in suitable time and relation.

6. The combination with a rotatable clutch, of driving means for rotating the clutch in opposite directions or in the same direction at different speeds, fluid-pressure-operated devices carried by the clutch for clutching it to one or the other of said driving means, a valve for controlling the distribution of the pressure fluid to the said pressure-operated devices, rotatable means for operating the valve, and means for rotating or oscillating the valve-operated means in accordance with the direction of rotation of the clutch.

7. The combination with a rotatable clutch, of driving means for rotating the clutch in opposite directions, or in the same direction at different speeds, fluid-pressure-operated devices carried by the clutch for engaging with either of the said driving means, a valve for controlling the distribution of the pressure fluid to the clutch, and rotatable means operatively connected with the clutch for operating the valve to reverse and change the oscillations or the rotations of the clutch.

8. The combination with a driven shaft, of a fluid-pressure-operated rotatable clutch provided with means for optionally oscillating or rotating the said driven shaft, a valve for controlling the distribution of the pressure fluid to the said clutch, and means operable with the said driven shaft for operating the valve in accordance with the desired rotations and oscillations of the shaft.

9. The combination with a driven shaft, of a fluid-pressure-operated rotatable clutch provided with means for oscillating or rotating the said driven shaft, a valve for controlling the distribution of the pressure fluid to the said clutch, and adjustable means operatively connected with the driven shaft for operating the said clutch in suitable time relation to the desired rotations and oscillations of the shaft.

10. The combination of a fluid-pressure-operated rotatable clutch, a valve for controlling the distribution of the pressure fluid to the said clutch, a valve-operating cam, and an adjustable driving connection between the clutch and the cam.

11. In combination with a fluid-pressure-operated clutch for rotating in opposite directions, or in the same direction at different speeds, a cam for controlling the operations of the clutch, and an adjustable driving connection between the clutch and the cam, provided with angularly-adjustable dogs or collars, for engaging with the cam.

12. The combination with a fluid-pressure-operated clutch, an automatic stop for shutting off the pressure fluid, comprising a conduit for the pressure fluid, a valve for intercepting the passage through the conduit, provided with a port for permitting the pressure fluid to pass at one position of the valve, a latch for holding the valve in that position, during the time for operating the clutch, and means operable with the clutch for withdrawing the latch at a predetermined stage or period.

13. In combination with a fluid-pressure-operated clutch, an automatic stop for shutting off the pressure fluid, comprising a conduit for the pressure fluid, a valve operable by the pressure in the conduit, and provided with a port for permitting the passage of the pressure fluid through the conduit at one position of the valve, a latch for holding the valve in that position, against the pressure, during the time for operating the clutch, and means operable with the clutch for withdrawing the latch at a predetermined stage or period.

14. In combination with a fluid-pressure-operated clutch, a valve for controlling the distribution of the pressure fluid to the clutch, and a stop-valve operable from the clutch for cutting off the pressure-fluid supply to the distributing-valve at predetermined periods or stages.

15. In combination with a fluid-pressure-operated clutch, an automatic stop for shutting off the pressure fluid, comprising an inlet for the pressure fluid, a reciprocating valve extending into the pressure-fluid inlet, and provided with a port for permitting the passage of the pressure fluid to the outlet at one position of the valve, a latch for holding the valve in that position against the pressure during the time for operating the clutch, and means operable with the clutch for withdrawing the latch at a predetermined stage or period.

16. In combination with a fluid-pressure-operated clutch, a valve for controlling the distribution of pressure fluid to the clutch, a stop-valve operable by the pressure to stop the supply, and provided with a port for permitting the passage of the pressure fluid at one position of the valve, and means for latching the valve in that position against the pressure.

17. In combination with a fluid-pressure-operated clutch, a valve for controlling the distribution of pressure fluid to the clutch, a stop-valve operable by the pressure to stop the supply, and provided with a port for permitting the passage of the pressure fluid at one position of the valve, means for latching the valve in that position against the pressure, and means operable by the clutch for unlatching the valve, and allowing it to close and shut off the supply at a predetermined stage or period.

18. In combination with a fluid-pressure-operated clutch, a valve for controlling the distribution of the pressure fluid to the clutch, a stop-valve operable from the pressure under the control of the clutch, for cutting off the pressure-fluid supply from the distributing-valve at predetermined periods or stages, and a pressure-fluid-operated alarm, with means for diverting the exhaust pressure fluid to the alarm, upon the closing of the stop-valve.

Signed at Hartford, Connecticut, this 18th day of May, 1901.

B. M. W. HANSON.

Witnesses:
F. V. BARTLETT,
WM. H. HONISS.